US012614223B2

(12) United States Patent
Scheibelhut et al.

(10) Patent No.: US 12,614,223 B2
(45) Date of Patent: Apr. 28, 2026

(54) DYNAMIC DETERMINATION OF EVENT TYPE USING MULTITASK CLASSIFICATION MODEL FOR INCREASING EFFICIENCY OF ITEM PIPELINE

(71) Applicant: Maplebear Inc., San Francisco, CA (US)

(72) Inventors: Brent Scheibelhut, Toronto (CA); Naval Shah, Toronto (CA); Mark Oberemk, Toronto (CA); Madeline Mesard, New York, NY (US); Akshay Bagai, Oakville (CA); Charles Wesley, San Diego, CA (US)

(73) Assignee: Maplebear Inc., San Francisco, CA (US)

( * ) Notice: Subject to any disclaimer, the term of this patent is extended or adjusted under 35 U.S.C. 154(b) by 183 days.

(21) Appl. No.: 18/583,570

(22) Filed: Feb. 21, 2024

(65) Prior Publication Data

US 2025/0265633 A1      Aug. 21, 2025

(51) Int. Cl.
*G06Q 30/0601*      (2023.01)
*G06N 3/084*      (2023.01)
(Continued)

(52) U.S. Cl.
CPC ......... *G06Q 30/0633* (2013.01); *G06N 3/084* (2013.01); *G06Q 30/0202* (2013.01); *G06Q 30/0253* (2013.01); *G06Q 30/0639* (2013.01)

(58) Field of Classification Search
CPC ........... G06Q 30/0633; G06Q 30/0202; G06Q 30/0253; G06Q 30/0639; G06N 3/084
(Continued)

(56) References Cited

U.S. PATENT DOCUMENTS 10,847,138 B2 * 11/2020 Ward ...................... G10L 15/16
2009/0319365 A1 * 12/2009 Waggoner .............. G06Q 30/02
705/26.1
(Continued)

FOREIGN PATENT DOCUMENTS

CA          2556778 C  *  8/2019   ......... G06Q 30/0224
WO     WO-2005086059 A1 *  9/2005   ......... G06Q 30/0631

OTHER PUBLICATIONS

Ariannezhad,Mozhdeh,etal."Apersonalizedneighborhood-basedmodelforwithin-basketrecommendationingroceryshopping."Proceedingsof theSixteenthACMinternationalconferenceonwebsearchand datamining.2023. (Year: 2023).*

*Primary Examiner* — Romain Jeanty
(74) *Attorney, Agent, or Firm* — Fenwick & West LLP

(57)          ABSTRACT

An online concierge system dynamically determines types of shopping events. The types may be used in various ways to increase efficiency of an item pipeline. The system may monitor interactions of a customer with an ordering interface on a customer client device associated with the customer. The monitoring may be during a shopping event that is categorized by a type, wherein the type describes a purpose of the shopping event. Responsive to a monitored interaction being an interaction from a set of trigger interactions, the system may determine a type of shopping event by applying the monitored interaction and content of a shopping cart of the ordering interface to a type prediction model. The system may assign an updated type to be the determined type, and perform an action based in part on the updated type.

20 Claims, 5 Drawing Sheets

(51) Int. Cl.
   G06Q 30/0202         (2023.01)
   G06Q 30/0251         (2023.01)
(58) Field of Classification Search
   USPC ........................................................ 705/7.31
   See application file for complete search history.

(56)                    References Cited

U.S. PATENT DOCUMENTS

2014/0372197 A1 *   12/2014   Muhammad ....... G06Q 30/0643
                                                             705/14.33
2019/0043115 A1 *    2/2019   Purves ............... G06Q 30/0239

* cited by examiner

300

400

Customer Client
Device
100

Online Concierge
System
140

Detect
Interaction
405

410

Interaction
Corresponds to
Trigger Interaction
415

Determine Type of
Shopping Event
420

Assign Type
422

Perform Action
425

430

Order
Complete
435

DYNAMIC DETERMINATION OF EVENT TYPE USING MULTITASK CLASSIFICATION MODEL FOR INCREASING EFFICIENCY OF ITEM PIPELINE

BACKGROUND

Previous approaches to monitoring user interactions with online systems events have typically relied on manual observation or basic tracking methods that do not consider the user's specific purpose or intent. These approaches often lack the ability to accurately determine the purpose of such online interactions based on user interactions and other contextual information (e.g., the content of an online cart). As a result, the actions taken based on these approaches can be limited in how much they are able to affect an item pipeline through which an item moves from a supplier to a user.

SUMMARY

In accordance with one or more aspects of the disclosure, dynamic determination of a shopping event is described. The types may be used in various ways to increase efficiency of an item pipeline. An online concierge system may monitor interactions of a customer with an ordering interface on a customer client device associated with the customer. The monitoring may be during a shopping event. The shopping event may be categorized by one or more types that describe a purpose of the shopping event. The online concierge system may determine if a monitored interaction corresponds to an interaction from a set of trigger interactions. Responsive to a monitored interaction corresponding to an interaction from the set of trigger interactions, the online concierge system may determine a type of shopping event. The online concierge system may determine the type of shopping event by applying the monitored interaction and content of a shopping cart of the ordering interface to a type prediction model. In some embodiments, the type prediction model may also use one or more additional model inputs (e.g., customer data, order data) in determining the type. The online ordering system may assign an updated type to be the determined type.

For the shopping event, in one or more embodiments, there may be multiple interactions over the course of the shopping event that correspond to interactions from the set of trigger interactions. As such, the online concierge system may recompute the type and update the type to match the recomputed type multiple times during the shopping event. Accordingly, the online concierge system is able to dynamically update the type initially predicted to an increasingly accurate type as a shopping event progresses. The online ordering system may perform one or more actions (e.g., demand forecasting, targeted advertisements) during and/or after the shopping event based in part on the determined type(s).

In some aspects, the techniques described herein relate to a method, performed at a computer system including a processor and a non-transitory computer readable medium, including: monitoring interactions of a customer with an ordering interface on a customer client device associated with the customer during a shopping event that is categorized by a type, wherein the type describes a purpose of the shopping event; responsive to a monitored interaction being an interaction from a set of trigger interactions, determining, by the computer system, a type of shopping event by the computer system applying the monitored interaction and content of a shopping cart of the ordering interface to a type prediction model, wherein the type prediction model is a machine learned model that was trained by: accessing a set of training examples including test interactions, test trigger interactions, content from test shopping carts, and associated types of shopping events, applying the type prediction model to the set of training examples to generate a training output corresponding to a predicted type of shopping event, backpropagating one or more error terms obtained from one or more loss functions to update a set of parameters of the type prediction model, and one or more of the error terms are based on a difference between a label applied to a test interaction of the set of training examples and the predicted type of shopping event, and stopping the backpropagation after the one or more loss functions satisfy one or more criteria, assigning an updated type to be the determined type, and performing an action based in part on the updated type.

In some aspects, the techniques described herein relate to a computer program product including a non-transitory computer readable storage medium having instructions encoded thereon that, when executed by a processor of a computer system, cause the computer system to: monitor interactions of a customer with an ordering interface on a customer client device associated with the customer during a shopping event that is categorized by a type, wherein the type describes a purpose of the shopping event; in response to a monitored interaction being an interaction from a set of trigger interactions, determine, by the computer system, a type of shopping event by the computer system applying the monitored interaction and content of a shopping cart of the ordering interface to a type prediction model, wherein the type prediction model is a machine learned model that was trained by: accessing a set of training examples including test interactions, test trigger interactions, content from test shopping carts, and associated types of shopping events, applying the type prediction model to the set of training examples to generate a training output corresponding to a predicted type of shopping event, backpropagating one or more error terms obtained from one or more loss functions to update a set of parameters of the type prediction model, and one or more of the error terms are based on a difference between a label applied to a test interaction of the set of training examples and the predicted type of shopping event, and stopping the backpropagation after the one or more loss functions satisfy one or more criteria, assign an updated type to be the determined type, and perform an action based in part on the updated type.

In some aspects, the techniques described herein relate to a computer system including: a processor; and a non-transitory computer readable storage medium having instructions encoded thereon that, when executed by the processor, cause the processor to: monitor interactions of a customer with an ordering interface on a customer client device associated with the customer during a shopping event that is categorized by a type, wherein the type describes a purpose of the shopping event; and in response to a monitored interaction being an interaction from a set of trigger interactions, determine, by the computer system, a type of shopping event by the computer system applying the monitored interaction and content of a shopping cart of the ordering interface to a type prediction model, wherein the type prediction model is a machine learned model that was trained by: accessing a set of training examples including test interactions, test trigger interactions, content from test shopping carts, and associated types of shopping events, applying the type prediction model to the set of training examples to generate a training output corresponding to a predicted type of shopping event, backpropagating one or more error terms obtained from one or more loss functions to update a set of parameters of the type prediction model, and one or more of the error terms are based on a difference between a label applied to a test interaction of the set of training examples and the predicted type of shopping event, and stopping the backpropagation after the one or more loss functions satisfy one or more criteria, assign an updated type to be the determined type, and perform an action based in part on the updated type.

DETAILED DESCRIPTION

Figure 1:
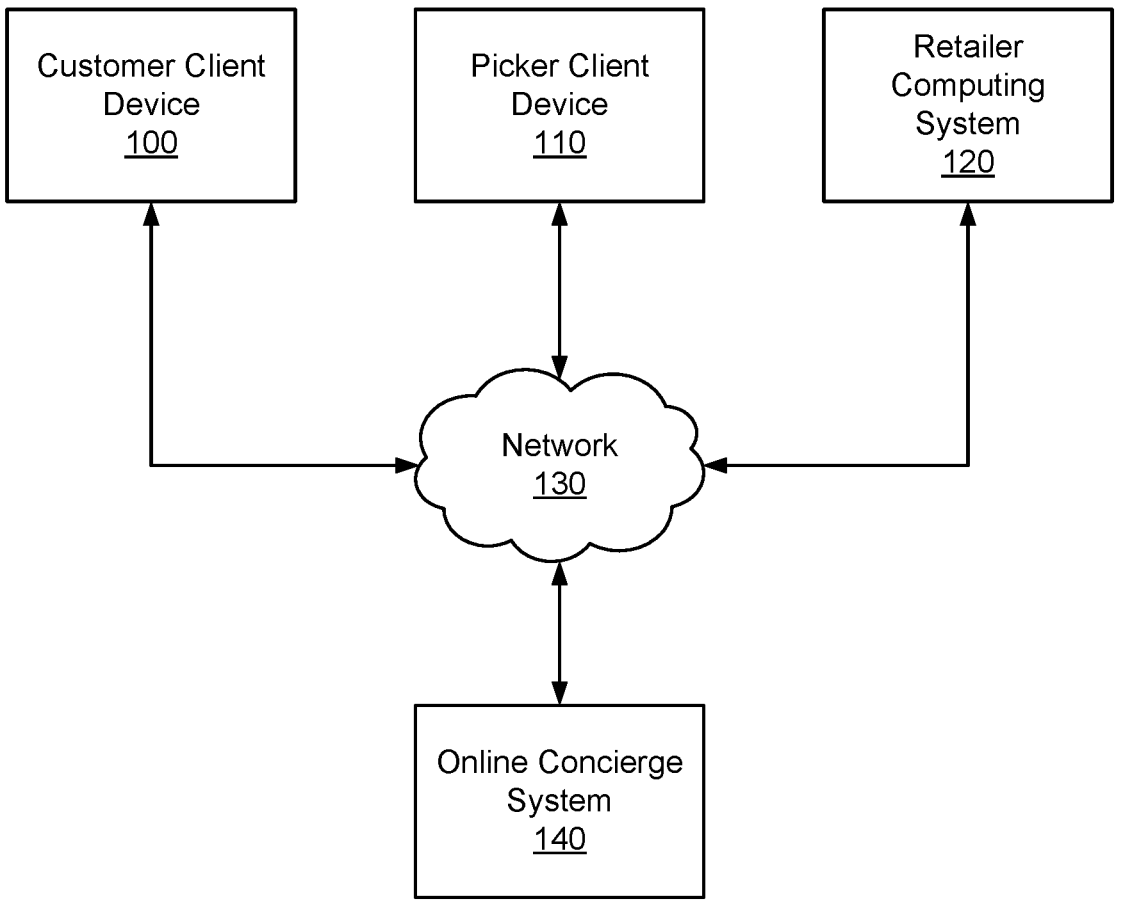
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 may be a smart cart. A smart cart is a physical cart that includes sensors (e.g., camera, scanner, scale, etc.) to detect items placed in the smart cart, a display, and a controller. For example, the controller may use data from the sensors to identify items placed in the cart, and present which items are in the smart cart (and, e.g., a current total price of the items) using the display. The controller also may add and/or remove items to a shopping cart (online) of the online concierge system 140 to ensure that the content of the shopping cart is the same as the content of the smart cart. The controller may also use the display to present advertisements for items in accordance with instructions from the online concierge system 140. In some embodiments, once a customer is done shopping, the customer may pay via the smart cart without having to go through the conventional check-out line. In some embodiments, the customer client device 100 executes a client application that uses an application programming interface (API) to communicate with the online concierge system 140.

A customer uses the customer client device 100 to place an order with the online concierge system 140 as part of a shopping event. A shopping event describes a time period over which a customer starts and completes an order. The shopping event is categorized by one or more types that describe one or more purposes of the shopping event. For example, the shopping event may be categorized by one or more types such as, e.g., bulk shop, week meal shop, lunch shop, tonight's dinner shop, game day shop, gift shop, quick shop, some other purpose, prepare foods (such as a retailer's or a restaurant's), bulk household supplies, back to school items, impulse buys, etc. An order specifies a set of items to be delivered to the customer. An "item," as used herein, means a good or product that can be provided to the customer through the online concierge system 140, using the online concierge system 140 and a smart cart, or some combination thereof. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected. In some embodiments, the customer client device 100 may alter the ordering interface in accordance with instructions from the online concierge system 140. For example, the customer client device 100 may add one or more options to the ordering interface in accordance with instructions from the online concierge system 140. The one or more options may include, e.g., presenting one or more retailers associated with a specific type of shopping event for selection.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. Retailers may be associated with one or more types. For example, a warehouse store that sells items in bulk may be associated with a type of "bulk shop," whereas a grocery store may be associated with a type of "weekday meal shop." The retailer computing system 120 stores and provides item data to the online concierge system 140 and may regularly update the online concierge system 140 with updated item data. For example, the retailer computing system 120 provides item data indicating which items are available a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items (e.g., during a shopping event) to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

The online concierge system 140 monitors interactions of customers with their respective ordering interfaces on their respective customer client devices 100. For a given customer, responsive to a monitored interaction corresponding to an interaction from a set of trigger interactions (e.g., an adjustment to content of the shopping cart), the online concierge system 140 may determine a type of shopping event. The online concierge system 140 may determine the type of shopping event by applying one or more model inputs (e.g., the monitored interaction and content of a shopping cart of the ordering interface) to a type prediction model. In some embodiments, in addition to a most recent monitored interaction (from the set of trigger interactions) the type prediction model uses some or all of the previously provided interactions (from the set of trigger interactions) to determine an updated type. Accordingly, the online concierge system 140 is able to dynamically update the type initially predicted to an increasingly accurate type as a shopping event progresses.

The online concierge system 140 may be configured to perform one or more actions (e.g., update demand forecast, provide targeted advertisement, etc.) based in part on the updated type. The actions are such that they may improve the item pipeline controlled by the online concierge system 140. The item pipeline describes how items move from retailers to customers. The online concierge system 140 is described in further detail below with regards to FIG. 2.

Figure 2:
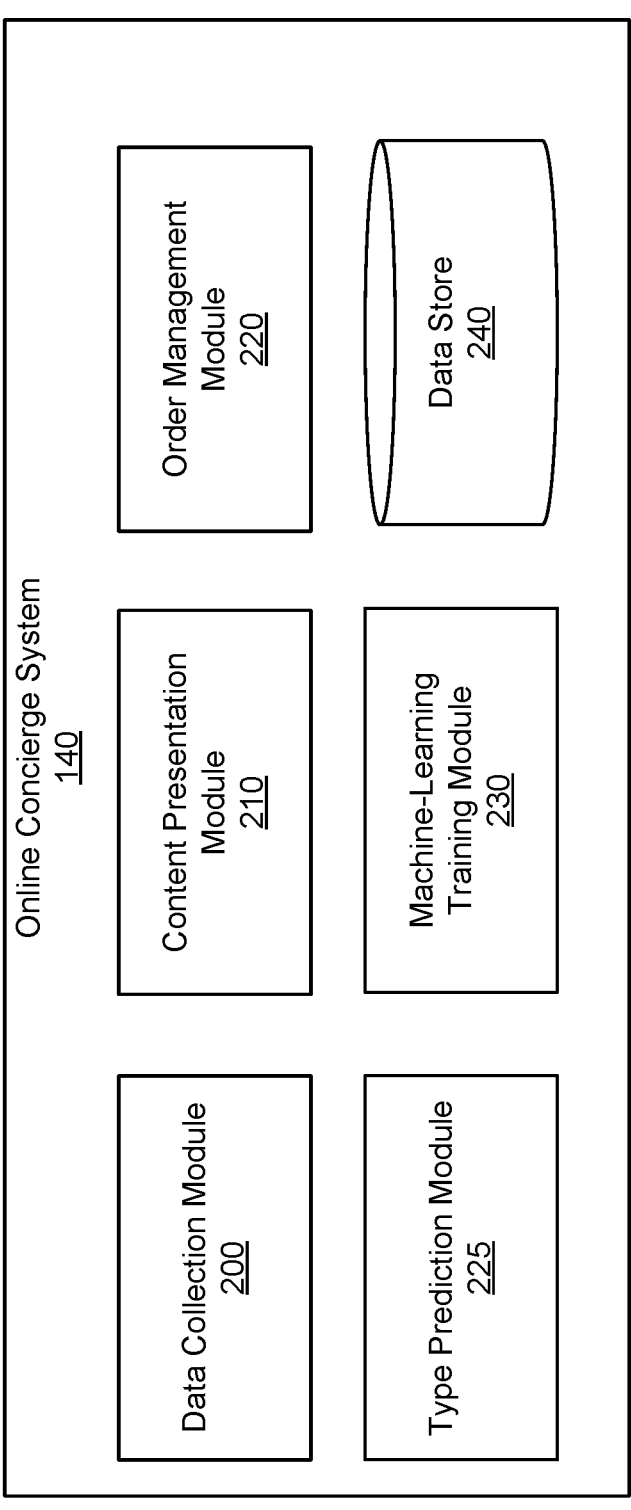
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a type prediction module 225, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, stored payment instruments, or some combination thereof. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), whether it is a foundational item, or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, the picker's previous shopping history, an amount of space available to the picker to transport items (e.g., basket on back of moped, truck bed, etc.), some other information or data that describes characteristics of pickers, or some combination thereof. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a type of the shopping event that includes the order, time of the shopping event, type associated with the retailer, entry point to the order, a delivery location for the order, a customer associated with the order, a retailer location from which the customer wants the ordered items collected, a timeframe within which the customer wants the order delivered, type of customer client device 100, historical data describing times the customer had shopping events and the associated types of the shopping events, items previously purchased, some other information or data that describes characteristics of the order, or some combination thereof. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The type prediction module 225 monitors monitoring interactions of customers with their respective ordering interfaces on their respective customer client devices 100. The type prediction module 225 monitors the interactions during respective shopping events for the customers. A shopping event is categorized by one or more types (e.g., bulk shop, weekday meal prep, quick shop, etc.), where the type describes a purpose of the shopping event. The type prediction module 225 determines whether a monitored interaction corresponds to an interaction from a set of trigger interactions. The set of trigger interactions are interactions, that if present, the type prediction module 225 updates a type of the shopping event. The set of trigger actions may include, e.g., an adjustment to content (e.g., add or remove an item) of a shopping cart of the customer, an adjustment to content (e.g., add or remove an item) of a smart cart of the customer, customer selection of a new item, customer selection of a new item category, customer selection of a retailer, or some combination thereof.

In some embodiments, for a given customer, responsive to a monitored interaction being an interaction from the set of trigger interactions, the type prediction module 225 may determine a type of shopping event by applying the monitored interaction and content of a shopping cart of the ordering interface to a type prediction model. For example, if a customer is adding only dry goods or freezer items, and they are in multiple quantities (e.g., 5 cans of beans), the type prediction module 225 may determine that the type of shop event is "bulk shop."

The type prediction model is a machine learned model that is configured to predict the type using one or more model inputs. In some embodiments, the type prediction model is a multitask classifier. A model input is data applied to the type prediction model to predict a type of a shopping event. Model inputs may include, e.g., the content of the shopping cart, interactions that correspond to the set of trigger interactions, customer data, item data, order data, or some combination thereof. Order data is data describing an order of a shopping event. Order data may include, e.g., time of the shopping event, type associated with the retailer, entry point to the order, delivery location (e.g., home, work, other location), type of customer client device 100. Time of the shopping event can be indicative of type as some customers regularly do certain types of shopping at certain times (e.g., bulk shopping first weekend of the month). The entry point to the order can be indicative of a type of shopping event as, e.g., if a customer links to online concierge system 140 from a specific email promotion, the type prediction module 225 can infer that they are trying to hit the terms of the promotion: perhaps getting to a particular basket size, for instance. The type of customer client device 100 may be indicative of a type of shopping event as, e.g., a customer may use a particular type of the customer client device 100 for certain types of shopping events (e.g., use desktop computer for bulk shop, but uses smart cart for tonight's dinner).

For a given shopping event, there may be multiple interactions over the course of the shopping event that correspond to interactions from the set of trigger interactions. As such the type prediction module 225, for each interaction that corresponds to an interaction from the set of trigger interactions, generates an updated prediction of the type (e.g., re-computes and updates the type). For each re-computation, the type prediction module 225 may weigh the change in the shopping cart items alongside the interaction. In some embodiments, some or all of the interactions (corresponding to an interaction in the set of trigger interactions) may have different weights. For example, viewing an item may have a different weight than adding an item to the shopping cart. In some embodiments, in addition to a most recent monitored interaction (that corresponds to an interaction from the set of trigger interactions) the type prediction model uses some or all of the previously provided interactions (that correspond to interactions from the set of trigger interactions) to determine an updated type. Accordingly, the type prediction module 225 is able to dynamically update the type initially predicted to an increasingly accurate type as a shopping event progresses.

In some embodiments, certain items, referred to as foundational items, are heavily weighted toward specific types of shopping events. For example, a foundational item that is a 12 pack of paper towels may be weighted to be associated with a bulk shop and have substantially less weighting as being associated with a weekday meal shopping type of shopping event. For example, responsive to instructions from a customer, the order management module 220 may add a first item to the shopping cart such that the shopping cart includes the first item and a second item. The type prediction module 225 may determine that the first item is a foundational item and has a first weight for a first type of shopping event that is greater than weights for other types of shopping events. And the second item, not being a foundational item, may have a second weight for the first type of shopping event that is less than the first weight. Accordingly, the type prediction model may be more heavily influenced by the foundational item to predict a type to be the first type than the second item.

The type prediction module 225 may be configured to perform one or more actions based in part on the updated type. The type prediction module 225 may perform the actions during and/or after the shopping event. The actions are such that they may improve operation of an item pipeline. The item pipeline describes how items move from retailers to customers.

In some embodiments, an action may be to update demand forecasting for the type prediction module 225. For example, the type prediction module 225 may gather historical data describing times customers have had shopping events and the associated types of the shopping events. The type prediction module 225 may apply the historical data to a demand forecasting model to determine expected types of shopping events going forward at specific times in the future. The demand forecasting model may be a machine learned model. In some embodiments, the demand forecasting model may be part of the type prediction model. The type prediction module 225 may then coordinate with pickers (e.g., via the order management module 220) to be available at the specific times. In this manner, the type prediction module 225 may reduce delivery times and help improve the item pipeline. For example, if the type prediction module 225 found Tuesday at 5:00 PM is historically focused around highly focused and fast convenience orders, the type prediction module 225 could optimize (e.g., via the order management module 220) for having pickers near convenience locations on high-mobility options (e.g. bikes). Comparatively, if the type prediction module 225 found that bulk shopping primarily happening on weekends, then the type prediction module 225 could optimize for pickers with larger vehicles to be online and available on the weekends. In another example, if a customer is ordering for a single weeknight dinner, the customer probably would abandon their order if the customer were not able to get a short delivery time, so the type prediction module 225 could prioritize those types of shops.

In some embodiments, an action may be to determine a priority for fulfilling the order. The type prediction module 225 may select a priority for fulfilling an order based in part on the type of shopping event. For example, if the type is a bulk shop, the customer likely does not need immediate delivery, and the type prediction module 225 may offer (e.g., via the order management module 220) later delivery times when it is cheaper to fulfill. In contrast, if the type is tonight's dinner shop, the type prediction module 225 may offer more immediate delivery options, even if they are more expensive. In this manner, the type prediction module 225 can adjust priority of fulfillment to improve the item pipeline.

In some embodiments, an action may be to select an item of an online catalog based in part on the type and/or updated type. The type prediction module 225 may then select an advertisement for the selected item. For example, if the type is "quick shop," the type prediction module 225 may select an advertisement that is $2 off an item. Whereas, if the type is "bulk shop" the type prediction module 225 may select an advertisement for an item that is buy 2 get 1 free. In another example, if the type is "Tonight's dinner shop" the type prediction module 225 may select advertisements for items that generally pair well with the meal (e.g., wine and cheese), items that are found in similar carts, or some combination thereof. In some embodiments, the selection of the advertisement is further based on whether the customer client device 100 is a smart cart. And if the customer client device 100 is a smart cart, the type prediction module 225 may also select the advertisement based in part on, e.g., a size of the smart cart, which aisle the customer is in, which aisles the customer has not been to, where items are placed in the smart cart, etc.

The type prediction module 225 may provide the selected advertisement for the item to the customer client device 100. For example, if the updated type is bulk shop, the type prediction module 225 may select an advertisement for a 5 lb. bag of sugar to be provided to the customer client device 100. By providing advertising that is based in part on type, the online concierge system 140 (as well as retailers and/or consumer package good companies) is better able to target advertisements that a customer would find useful.

In some embodiments, an action may be to instruct the customer client device 100 to adjust the ordering interface based in part on the type. The type prediction module 225 may determine one or more options to add to the ordering interface based in part on the updated type. The type prediction module 225 may instruct the customer client device 100 to update the ordering interface with the option. For example, if the type is bulk shop, the type prediction module 225 may determine a list of retailers that are commonly used for bulk shop to the customer. The type prediction module 225 may include the list of retailers as options to be added to the ordering interface, and instruct the customer client device 100 to update its ordering interface with the options.

The machine learning training module 230 trains machine learning models used by the online concierge system 140. For example, the machine learning training module 230 may train the type prediction model and the demand forecasting model. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, order data. The training examples may also include test interactions, test trigger interactions, content from test shopping carts, and associated types of shopping events. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, picker data, order data, monitored interactions, content of shopping carts, types of shopping events, etc., for use by the online concierge system 140. The data store 240 also stores trained machine learning models (e.g., the type prediction model, the demand forecast model, etc.) trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 3:
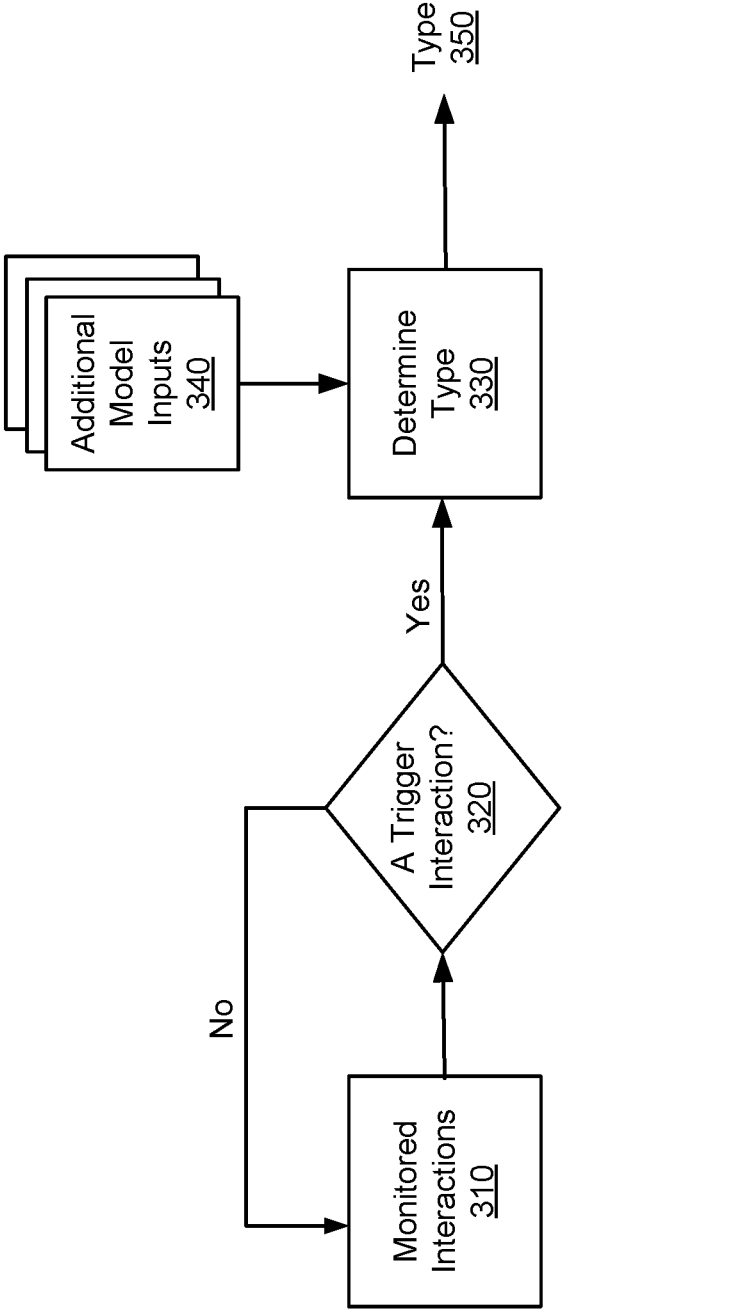
FIG. 3 illustrates a block diagram of an example flow for determination of a type of a shopping event, according to one or more embodiments.

FIG. 3 illustrates a block diagram 300 of an example flow for determination of a type of a shopping event, according to one or more embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140). Additionally, each of these steps may be performed automatically by the online concierge system without human intervention.

The online concierge system monitors 310 interactions of a customer with an ordering interface on a customer client device (e.g., the customer client device 100) associated with the customer during a shopping event. For example, responsive to the customer interacting with the customer client device, the customer client device can notify the online concierge system of the interaction.

The online concierge system determines 320 whether a monitored interaction corresponds to an interaction from a set of trigger interactions. For example, the customer adjusting font size on the ordering interface may not correspond to an interaction from the set of trigger interactions. In contrast, adding an item to a shopping cart may correspond to an interaction from the set of trigger interactions.

Responsive to a monitored interaction corresponding to an interaction from the set of trigger interactions, the online concierge system determines 330 a type of the shopping event, based in part on the interaction and one or more additional model inputs 340 (e.g., the content of the shopping cart, customer data, item data, order data, etc.). The online concierge system determines the type using a type prediction model. The online concierge system applies the interaction and one or more of the additional model inputs 340 to the type prediction model which uses the interaction and at least one of the additional model inputs 340 to predict a type 350 of the shopping event.

For the shopping event, there may be multiple interactions over the course of the shopping event that correspond to interactions from the set of trigger interactions. As such, the online concierge system may recompute the type 350 and update the type to match the recomputed type multiple times during the shopping event. Accordingly, the online concierge system is able to dynamically update the type initially predicted to an increasingly accurate type as a shopping event progresses.

Figure 4:
FIG. 4 is an example sequence diagram for determining a type of a shopping event and performing actions based on the determined type, in accordance with some embodiments.

FIG. 4 is an example sequence diagram 400 for determining a type of a shopping event and performing actions based on the determined type, in accordance with some embodiments. Alternative embodiments may include more, fewer, or different interactions from those illustrated in FIG. 4, and the steps may be performed in a different order from that illustrated in FIG. 4.

The customer client device 100 detects 405 an interaction. The interaction may be with an ordering interface of the customer client device 100 at a particular time. For example, the interaction may be to select a retailer for a shopping event. For example, the selected retailer may be a bulk warehouse store, and the customer may have made the interaction on Sunday morning via their desktop computer. The customer client device 100 notifies 410 the online concierge system 140 of the interaction.

In the illustrated embodiment, the online concierge system 140 determines 415 that the interaction corresponds to an interaction of a set of trigger interactions. The online concierge system 140 then determines 420 a type of the shopping event. The online concierge system 140 may determine the type using a type prediction model, the interaction, and one or more additional model inputs. Continuing with the example above the selected retailer is a bulk warehouse store. These types of retailers are associated with a type of "bulk shop." Additionally, some model inputs like, e.g., the time of the interaction and the type of the customer client device can also be used by the type prediction model to help increase the accuracy of the predicted type. For example, the order data for the customer may indicate that the customer historically places orders associated with bulk shop on Sunday mornings via their desktop computer. Following this example, the predicted type may be bulk shop. The online concierge system 140 then assigns 422 the predicted type as an updated type of the shopping event.

The online concierge system 140 may perform 425 an action based in part on the determined type. For example, the online concierge system 140 may select an advertisement based in part on the updated type. For example, if the updated type is "bulk shop," the online concierge system 140 may select an advertisement for an item that is buy 2 get 1 free. The online concierge system 140 may provide 430 the advertisement to the customer client device 100 for presentation to the customer.

In the above example, the customer had not yet added anything to a shopping cart of the ordering interface. As adding (and removing) items are interactions that correspond to the set of trigger interactions, each adjustment of content of the shopping cart results in a re-computation of the type of the shopping event. In effect, steps 405-422 may repeat multiple times as the shopping event progresses, eventually culminating in a final updated type of the shopping event. For example, during the course of the shopping event, the type may have migrated from "bulk shop" to "tonight's dinner shop," and the online concierge system 140. Additionally, while step 425 is shown directly after step 422, in some embodiments, the online concierge system 140 may perform a threshold number of iterations of steps 415-422 before the online concierge system 140 performs step 425. This can help ensure the action is based on a potentially more accurate type than was initially predicted.

Figure 5:
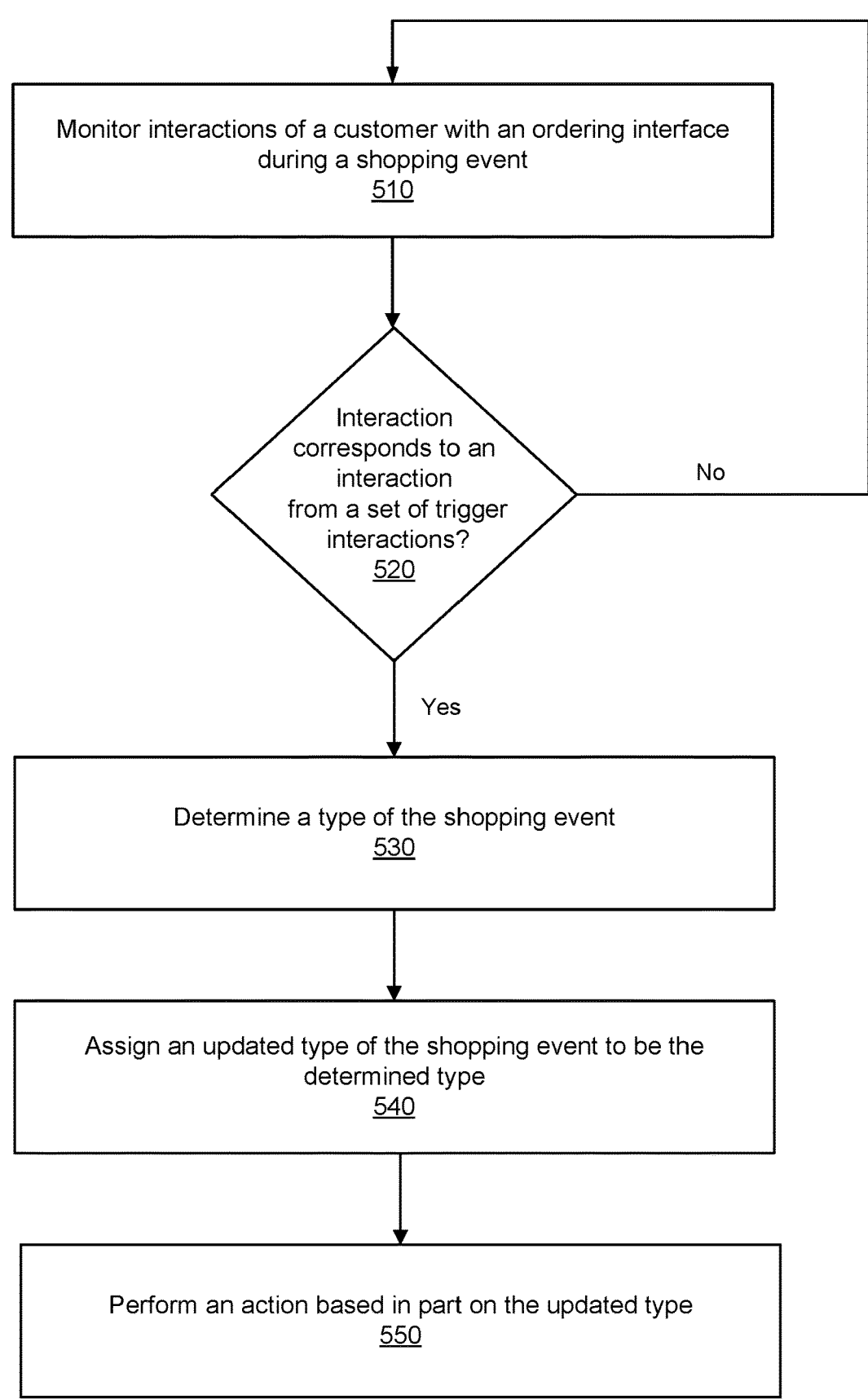
FIG. 5 is a flowchart for a method for determining a type of a shopping event, in accordance with some embodiments.

FIG. 5 is a flowchart for a method of determining a type of a shopping event, in accordance with some embodiments. Alternative embodiments may include more, fewer, or different steps from those illustrated in FIG. 5, and the steps may be performed in a different order from that illustrated in FIG. 5. These steps may be performed by an online concierge system (e.g., online concierge system 140). Additionally, each of these steps may be performed automatically by the online concierge system without human intervention.

The online concierge system monitors 510 interactions of a customer with an ordering interface during a shopping event. The ordering interface is on a customer client device (e.g., the customer client device 100) associated with the customer. A customer interacts with an ordering interface of the customer client device. For example, the customer may add an item to a shopping cart of the ordering interface. In some embodiments, responsive to the interaction, the customer client device provides the interaction to the online concierge system. In other embodiments, the customer client device determines whether the interaction corresponds to an interaction from a set of trigger interactions, and if it does, then provides the interaction to the online concierge system.

The online concierge system determines 520 whether a monitored interaction corresponds to an interaction from a set of trigger interactions (e.g., adding an item to a shopping cart, etc.). In embodiments where the monitored interaction does not correspond to an interaction from the set of trigger interactions, the process flow moves to step 510.

Responsive to a monitored interaction being an interaction from a set of trigger interactions, the online concierge system determines 530 a type of the shopping event. The online concierge system may apply the interaction and one or more additional model inputs to a type prediction model to determine the type of the shopping event. For example, the online concierge system may apply the monitored interaction and content of a shopping cart of the ordering interface to the type prediction model.

The online concierge system assigns 540 an updated type of the shopping event to be the determined type. In embodiments, where the online concierge system first calculates a type for a shopping event, the current type is null, and the online concierge system updates the null to be the determined type. And as additional monitored interactions satisfy step 520, the online concierge system again determines 530 a type of the shopping event. Accordingly, the online concierge system is able to dynamically update the type to an increasingly accurate type as a shopping event progresses.

The online concierge system performs 550 an action based in part on the updated type. The action may be to, e.g., update demand forecasting, determine a priority for fulfilling the order, select and provide advertisements, adjust the ordering interface, or some combination thereof.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a backpropagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a non-transitory computer readable medium, comprising:

monitoring interactions of a user with an ordering interface on a user client device associated with the user during a shopping event that is categorized by a type, wherein the type describes a purpose of the shopping event;

responsive to a monitored interaction being an interaction from a set of trigger interactions, determining, by the computer system, a type of shopping event by the computer system applying the monitored interaction and content of a shopping cart of the ordering interface to a type prediction model, wherein the type prediction model is a multitask classification machine learned model comprising shared layers and multiple output branches, each output branch being a classifier configured to determine whether the shopping event corresponds to a respective type from a set of predefined shopping event types, and wherein the type prediction model was trained by:

accessing a set of training examples including test interactions, test trigger interactions, content from test shopping carts, and associated types of shopping events, applying the type prediction model to the set of training examples to generate training outputs from the multiple output branches, wherein each output branch generates a prediction for its respective shopping event type, and backpropagating one or more error terms obtained from one or more loss functions to update a set of parameters of the type prediction model, wherein one or more of the error terms are based on a difference between a label applied to each output branch for a test interaction of the set of training examples and the predictions generated by the respective output branches;

assigning an updated type to be the determined type; and performing an action based in part on the updated type.

2. The method of claim 1, wherein performing the action based in part on the updated type comprises:

selecting an item of an online catalog based in part on the updated type; and providing an advertisement for the item to the user client device.

3. The method of claim 2, wherein the user client device is a smart cart and the type prediction model is configured to determine the updated type based in part on the content of the shopping cart and a size of the smart cart.

4. The method of claim 2, wherein the user client device is a smart cart, the method further comprising:

determining locations in the smart cart of items placed in the smart cart, wherein the type prediction model is configured to determine the updated type based in part on the content of the shopping cart and the determined locations.

5. The method of claim 2, wherein selecting the item of the online catalog based in part on the updated type comprises:

monitoring user location within a retailer during the shopping event;

determining, using the monitored user location, a target item associated with the updated type that is located in an aisle that has not been visited by the user; and selecting the target item as the item.

6. The method of claim 1, further comprising:

responsive to instructions from the user, adding a first item to the shopping cart such that the shopping cart includes the first item and a second item; and determining that the first item is a foundational item and has a first weight for a first type of shopping event that is greater than weights for other types of shopping events, wherein the second item has a second weight for the first type of shopping event that is less than the first weight;

wherein the type determined by the type prediction model is based in part on the first weight and the second weight.

7. The method of claim 1, wherein the set of trigger interactions include one or more of: an adjustment to content of the shopping cart, user selection of a new item, user selection of a new item category, or user selection of a retailer.

8. The method of claim 1, wherein performing the action based in part on the updated type comprises:

gathering historical data describing times the user has had shopping events and the associated types of the shopping events;

forecasting, by the computer system, a future time that a type of shopping event is predicted to occur by the computer system applying the historical data to a demand forecasting model; and coordinating with a picker to be available at the future time.

9. The method of claim 1, wherein performing the action based in part on the updated type comprises:

determining an option to add to the ordering interface based in part on the updated type; and instructing the user client device to update the ordering interface with the option.

10. The method of claim 9, further comprising:

selecting a retailer from a plurality of retailers based in part on the updated type, wherein the option is an option to select the retailer for the shopping event.

11. A computer program product comprising a non-transitory computer readable storage medium having instructions encoded thereon that, when executed by a processor of a computer system, cause the computer system to perform steps comprising:

monitoring interactions of a user with an ordering interface on a user client device associated with the user during a shopping event that is categorized by a type, wherein the type describes a purpose of the shopping event;

responsive to a monitored interaction being an interaction from a set of trigger interactions, determining, by the computer system, a type of shopping event by the computer system applying the monitored interaction and content of a shopping cart of the ordering interface to a type prediction model, wherein the type prediction model is a multitask classification machine learned model comprising shared layers and multiple output branches, each output branch being a classifier configured to determine whether the shopping event corresponds to a respective type from a set of predefined shopping event types, and wherein the type prediction model was trained by:

accessing a set of training examples including test interactions, test trigger interactions, content from test shopping carts, and associated types of shopping events, applying the type prediction model to the set of training examples to generate training outputs from the multiple output branches, wherein each output branch generates a prediction for its respective shopping event type, and backpropagating one or more error terms obtained from one or more loss functions to update a set of parameters of the type prediction model, wherein one or more of the error terms are based on a difference between a label applied to each output branch for a test interaction of the set of training examples and the predictions generated by the respective output branches;

assigning an updated type to be the determined type; and performing an action based in part on the updated type.

12. The computer program product of claim 11, wherein performing an action based in part on the updated type comprises:

selecting an item of an online catalog based in part on the updated type; and providing an advertisement for the item to the user client device.

13. The computer program product of claim 12, wherein the user client device is a smart cart and the type prediction model is configured to determine the updated type based in part on the content of the shopping cart and a size of the smart cart.

14. The computer program product of claim 12, wherein the user client device is a smart cart, the computer program product further comprising stored instructions that when executed cause the computer system to perform steps comprising:

determining locations in the smart cart of items placed in the smart cart, wherein the type prediction model is configured to determine the updated type based in part on the content of the shopping cart and the determined locations.

15. The computer program product of claim 12, wherein selecting the item of the online catalog based in part on the updated type comprises:

monitoring user location within a retailer during the shopping event;

determining, using the monitored user location, a target item associated with the updated type that is located in an aisle that has not been visited by the user; and selecting the target item as the item.

16. The computer program product of claim 11, further comprising stored instructions that when executed cause the computer system to perform steps comprising:

responsive to instructions from the user, adding a first item to the shopping cart such that the shopping cart includes the first item and a second item; and determining that the first item is a foundational item and has a first weight for a first type of shopping event that is greater than weights for other types of shopping events, wherein the second item has a second weight for the first type of shopping event that is less than the first weight;

wherein the type determined by the type prediction model is based in part on the first weight and the second weight.

17. The computer program product of claim 11, wherein performing the action based in part on the updated type comprises:

gathering historical data describing times the user has had shopping events and the associated types of the shopping events;

forecasting, by the computer system, a future time that a type of shopping event is predicted to occur by the computer system applying the historical data to a demand forecasting model; and coordinating with a picker to be available at the future time.

18. The computer program product of claim 11, wherein performing the action based in part on the updated type comprises:

determining an option to add to the ordering interface based in part on the updated type; and instructing the user client device to update the ordering interface with the option.

19. The computer program product of claim 18, further comprising stored instructions that when executed cause the computer system to perform steps comprising:

selecting a retailer from a plurality of retailers based in part on the updated type, wherein the option is an option to select the retailer for the shopping event.

20. A computer system comprising:

a processor; and a non-transitory computer readable storage medium having instructions encoded thereon that, when executed by the processor, cause the processor to perform steps comprising:

monitoring interactions of a user with an ordering interface on a user client device associated with the user during a shopping event that is categorized by a type, wherein the type describes a purpose of the shopping event;

responsive to a monitored interaction being an interaction from a set of trigger interactions, determining, by the computer system, a type of shopping event by the computer system applying the monitored interaction and content of a shopping cart of the ordering interface to a type prediction model, wherein the type prediction model is a multitask classification machine learned model comprising shared layers and multiple output branches, each output branch being a classifier configured to determine whether the shopping event corresponds to a respective type from a set of predefined shopping event types, and wherein the type prediction model was trained by:

accessing a set of training examples including test interactions, test trigger interactions, content from test shopping carts, and associated types of shopping events, applying the type prediction model to the set of training examples to generate training outputs from the multiple output branches, wherein each output branch generates a prediction for its respective shopping event type, and backpropagating one or more error terms obtained from one or more loss functions to update a set of parameters of the type prediction model, wherein one or more of the error terms are based on a difference between a label applied to each output branch for a test interaction of the set of training examples and the predictions generated by the respective output branches;

assigning an updated type to be the determined type; and performing an action based in part on the updated type.

* * * * *